US00RE35931E

United States Patent [19]

Schroder et al.

[11] E Patent Number: Re. 35,931

[45] Reissued Date of Patent: Oct. 20, 1998

[54] GOLF CLUB

[76] Inventors: Edward W. Schroder, Livonia, Mich.; Jeffrey Schroder, legal representative, 15979 Park La., Northville, Mich. 48167

[21] Appl. No.: 547,982

[22] Filed: Oct. 25, 1995

Related U.S. Patent Documents

Reissue of:

[64] Patent No.: 5,255,914
Issued: Oct. 26, 1993
Appl. No.: 937,376
Filed: Aug. 31, 1992

[51] Int. Cl.[6] ..... A63B 53/02

[52] U.S. Cl. ..... 473/305; 473/314; 473/345

[58] Field of Search ..... 473/305, 306, 473/307, 308, 309, 310, 311, 312, 314, 315, 316, 324, 345, 346, 282, 289

[56] References Cited

U.S. PATENT DOCUMENTS

| | | |
|---|---|---|
| 1,983,158 | 12/1934 | Young . |
| 2,146,048 | 2/1939 | Barnhart . |
| 3,166,320 | 1/1965 | Onions . |
| 3,815,910 | 6/1974 | Raines . |
| 3,819,181 | 6/1974 | Mills . |
| 3,966,210 | 6/1976 | Rozmus . |
| 3,980,301 | 9/1976 | Smith . |
| 4,417,731 | 11/1983 | Yamada . |
| 4,438,931 | 3/1984 | Momotiya . |
| 4,471,961 | 9/1984 | Masghati . |
| 4,697,813 | 10/1987 | Inoue . |
| 4,927,144 | 5/1990 | Stormon . |
| 5,042,806 | 8/1991 | Helmstetter . |
| 5,149,091 | 9/1992 | Okumoto . |
| 5,197,733 | 3/1993 | Schroder . |

FOREIGN PATENT DOCUMENTS

| | | | |
|---|---|---|---|
| 2230459 | 10/1990 | United Kingdom | 273/167 H |

*Primary Examiner*—Sebastiano Passaniti
*Attorney, Agent, or Firm*—Patrick M. Dwyer

[57] ABSTRACT

A golf club comprising a golf club head and a shaft assembly. The golf club head has a toe portion and a heel portion with a hole extending inwardly from the upper surface of the golf club head into the heel portion. The shaft assembly has a lower shaft portion that is angularly offset by 7 degrees to 15 degrees from the main elongated shaft portion of the shaft assembly. The lower shaft portion is received in the hole of the golf club head to interconnect the shaft assembly to the golf club head.

11 Claims, 2 Drawing Sheets

GOLF CLUB

Matter enclosed in heavy brackets [ ] appears in the original patent but forms no part of this reissue specification; matter printed in italics indicates the additions made by reissue.

BACKGROUND OF THE INVENTION

1. Field of Invention

The present invention relates to Golf Clubs that offer improved performance due to their novel construction. In the golf club of this invention, the center axis of the main elongated shaft, when extended through the club head, will pass in close proximity to the center of percussion of the golf club head. The lower portion of the main shaft is offset at an angle from the center axis of the main elongated portion of the shaft. A bored hole is provided in the club head which extends into the heel portion thereof from the upper surface of the club head through a protruding tilted neck. The bored hole in the heel portion receives the angularly off-set lower portion of the shaft. As the center axis of the lower shaft portion makes a greater acute angle with the horizontal plane or ground level than the center axis of the main elongated shaft when the golf club is held in an address position by the golfer, the tilted neck encompassing the bored hole, in which the lower shaft portion is received, can be angled in a more upright position than protruding hosels of conventional golf clubs. This achieves a decreased frontal surface area for the golf club head which provides a lower drag coefficient and greater club head speed for longer ball distance.

Further, the golf head of this invention improves the golfer's performance due to the reduction in the twisting or torque reaction as the center axis of the main elongated shaft when extended downward into the club head passes in close proximity to the center of percussion or center of mass of the club head. This decreases the distance of the moment arm of the force applied to the shaft by the golf ball when struck by the golf club, thus minimizing the twisting of the golf club in the golfer's hands. The end result is greater control to hit the golf ball in the desired direction due to less slicing or hooking of the golf ball.

The inventor, in a co-pending patent application, Ser. No. 633,263 filed Dec. 24, 1990, now U.S. Pat. No. 5,197,733, discloses a golf club shaft that has its lower portion angularly offset from the main elongated shaft portion but the lower shaft portion is received in a hole that extends inwardly towards the center of percussion rather than away from the center towards the heel portion of the club head as in this invention. The angularly offset lower shaft portion, after it is received in the hole of the club head but before it is adhesively bonded to interconnect the shaft to the club head, will allow for the adjustment of the face angle of the striking face of the club head by slightly rotating the main shaft. This method of adjustment during assembly as described in the co-pending patent application, Ser. No. 633,263, now U.S. Pat. No. 5,197,733, by the same inventor is still available to be applied to the golf club of this invention even though the lower shaft portion is angled towards the heel rather than towards the center of the club head.

2. Description of Prior Art

U.S. Pat. No. 3,966,210 shows a golf club head which has a straight shaft with the center axis thereof extending through the center of the club head. This prior art patent, though, does not incorporate an angled lower shaft portion or a bored hole extending into the heel of the club head to receive a lower shaft portion that is displaced from the center axis of the elongated main shaft. U.S. Pat. No. 3,166,320 discloses a golf club that has a bent shaft at the lower end thereof that is received in a bored hole in the club head. In this patent, the bored hole is so located to position the lower bent shaft portion towards the back or rear of the club head behind the center of percussion while maintaining the center axis of the main elongated shaft forward of the striking face to achieve a "caster" effect between the shaft and golf club head.

SUMMARY OF THE PRESENT INVENTION

In the present invention, the golf club head and the shaft are of an improved construction to impart greater accuracy and distance to the golf ball being impacted by the golf club of this invention being swung by the golfer.

This invention provides an angled lower shaft portion offset from the main elongated shaft portion which, when received in a bored hole in the club head, is directed towards the heel portion thereof. Because of the offset of the lower shaft portion being received in the heel portion, the main elongated shaft in relation to the club head can be positioned so that the lower segment of the main elongated shaft portion is moved closer to the center of the club head. The center axis of the main elongated shaft portion when extended downward into the club head passes in close proximity to the center of percussion of the club head. This reduces the torque factor of the golf club when striking the golf ball as the center of percussion which represents the center of mass of the club head, is at a decreased normal distance from the center axis of the main elongated shaft portion of the golf club to which the force is applied. The neck encompassing the upper part of the bored hole in the club head can be tilted in a more upright direction as the co-axial center axis of the hole and the lower shaft portion received therein make a greater acute angle with the ground level than the center axis of the main shaft which is usually maintained at about 55 degrees. As a result, the frontal surface area of the club head is decreased with the inherent advantage of minimizing the air drag coefficient.

One objective of this invention is to minimize twisting of the golf club in the hands of the golfer when he swings the golf club which reduces slicing or hooking of the golf ball.

Another objective of this invention is to achieve a lower drag coefficient for the club head due to a decrease in frontal surface area of the club head.

Another objective of this invention is to achieve a specific golf club structure that incorporates an angularly offset lower shaft portion received in an angled bored hole to allow for the application of the method of adjustment and assembly to the golf club of this invention as described in co-pending patent application Ser. No. 633,263 by the same inventor.

These and other objectives will become more apparent with reference to the accompanying drawings and following specifications:

DESCRIPTION OF THE PREFERRED EMBODIMENTS

Figure 1:
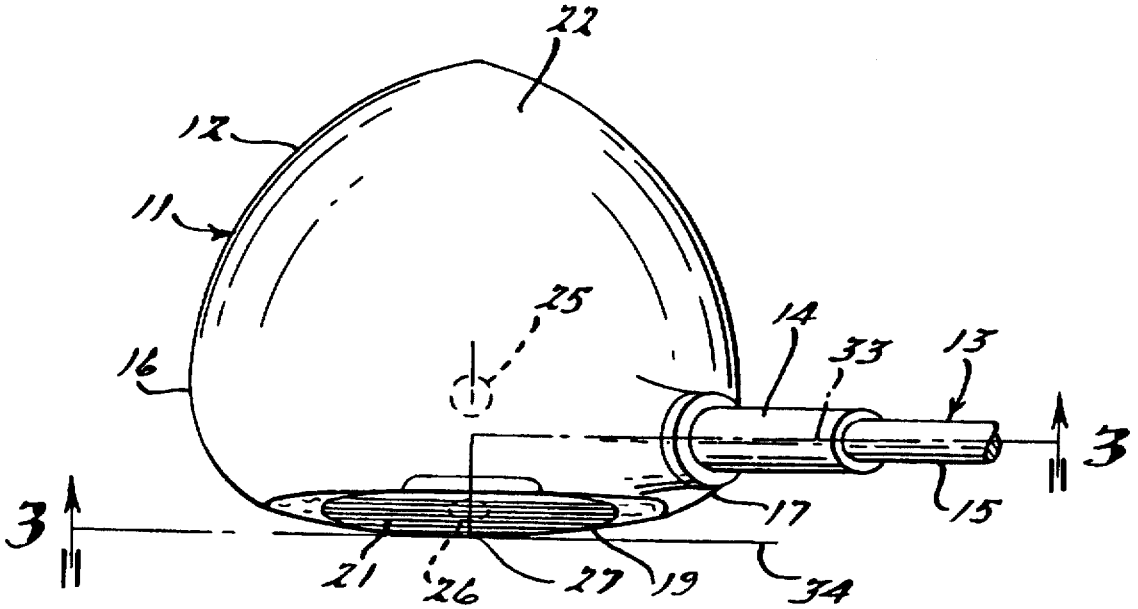
FIG. 1 is a top view of a golf club head and a portion of the shaft therefore embodying the teachings of this invention.
Figure 2:
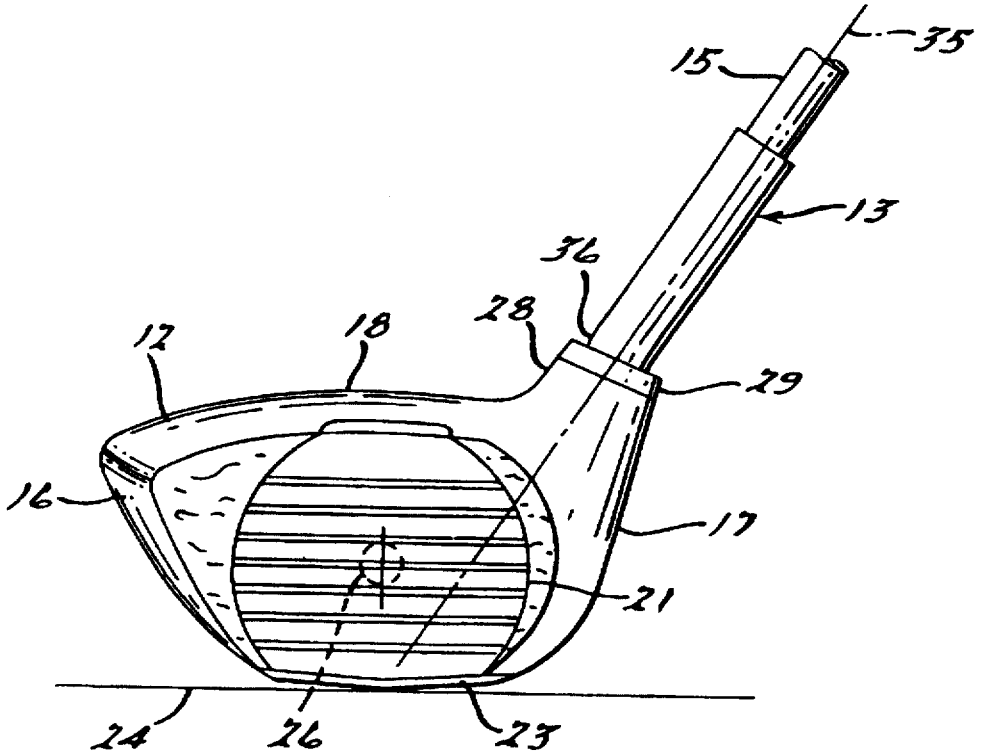
FIG. 2 is a frontal view of the golf club head and a portion of the shaft of FIG. 1.
Figure 3:
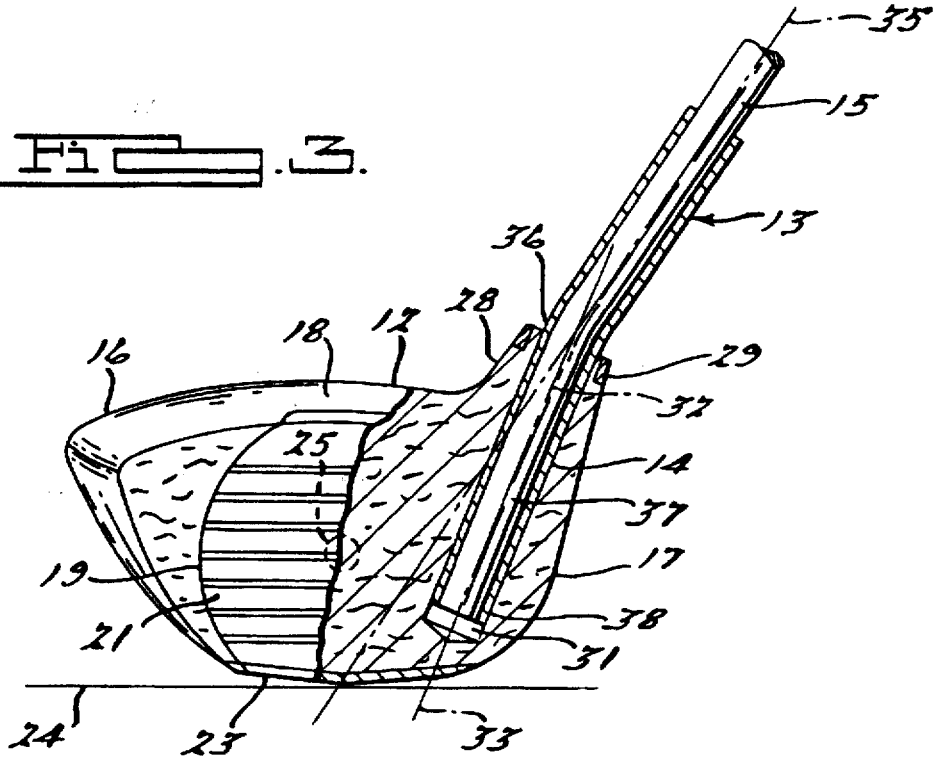
FIG. 3 is a frontal view, partially in section taken along line 3—3 of FIG. 1.

Referring to FIGS. 1, 2, and 3, a golf club 11 comprising a golf club head 12 and a shaft assembly 13 of this invention is depicted. The shaft assembly 13 is provided with a lower shaft portion 14 and a main elongated shaft portion 15. In the drawings, the golf club 11 is not shown in its entirety as the invention mostly encompasses the modification to the club head 12 and the lower portion 14 of the shaft assembly 13. The main elongated shaft portion 15 extends upwardly and terminates in a conventional grip (not shown) to allow the golfer to grasp and swing the golf club 11. The preferable golf club head 12 of this invention is a driver, also called a "wood", can be cut from a solid block such as persimmon, or laminated wood, or manufactured out of metal or plastic.

The club head 12 has a toe portion 16 and a heel portion 17 integrally formed with an upper surface 18 contiguous with the heel portion 17 and the toe portion 16. A generally convex-curved striking face 19 is provided at the frontal surface of the club head 12. An insert 21, usually fabricated from a high energy material, is recessed into the striking face 19. The club head 12 has a rear portion 22 opposite the striking face 19. A sole plate 23 as best seen in FIG. 2, is mounted to the bottom surface of the club head to protect the club head 12 when it makes contact with the earth or grass at ground level 24.

Each club head 12 has a center of percussion 25 at the point where the center of mass is located. The "sweet spot" 26 shown in FIG. 2 by a dotted circle is the center of percussion 25 transposed to the striking face 19 at its, forwardmost point 27 which is substantially at the center thereof. Each golfer, upon swinging the golf club 11, tries to impact the golf ball as close to the "sweet spot" 26 as possible to obtain optimum distance and accuracy.

In FIGS. 1, 2, and 3, the preferred embodiment of this invention is shown. The club head 12 is provided with a short neck 28 extending in an angular upward direction from the upper surface 18 at its heel portion 17. A metal ring 29 could be placed around the neck 28 to provide reinforcement if needed. The neck 28 encompasses the upper end of a bored hole 31 that extends inwardly from the top of the neck 28 into the heel portion 17 of the club head 12 at an angle of about 65 degrees with the horizontal ground level 24 when the golf club 11 is held in an address position by the golfer. The angle could range from 60 70 degrees depending on the configuration of the club head 12. In an address position, the main elongated shaft portion 15 is usually held by the golfer at an angle of about 55 degrees with the ground level 24 with the club head 12 resting on the ground behind the golf ball. The direction of the hole 31 bored into the heel portion 17 of the club head 12 is selected so that the center axis 32 of the hole 31 and the co-axial center of axis 33 of the lower shaft portion 14 when received in the hole 31 lie in a vertical plane that is substantially parallel with a second vertical plane extending through a horizontal line 34 which is tangent to the forwardmost part 27 of the striking face 19, substantially at its center or at the "sweet spot" 26 as seen in FIG. 1.

The center axis 33 of the lower shaft portion 14 is offset by an angle ranging from 7 degrees to 15 degrees from the center axis 35 of the main elongated shaft portion 15. The center axis 35, if extended downwardly into the club head 12, usually makes an angle of about 55 degrees with the ground level 24 when the golf club 11 is held in an address position by the golfer. As seen in FIG. 2, the extended axis 35 of the main elongated shaft portion 15 passes closer to the center of percussion 25 when measured along a straight line perpendicular to the axis 35 than would be the case with conventional golf clubs having protruding hosels.

In FIGS. 1, 2, and 3, the preferred embodiment of this invention shows that the lower shaft portion 14 of the shaft assembly 13 comprises a stub shaft 37 and a sleeve 38 encompassing the stub shaft 37. As best seen in FIG. 3, the sleeve 38 can be made out of metal tubing that slides onto the stub shaft 37. The stub shaft 37 could also be made integrally with or be an extension of the main elongated shaft portion 15 of the shaft assembly 13. The lower segment of the sleeve 38 received onto the stub shaft 37 can be bent together with the stub shaft 37 to be angularly offset from the main elongated shaft portion 15 so as to serve as the lower shaft portion 14 that is received in hole 31 in the club head 12. The sleeve 38 extends above the stub shaft 37 to also encompass the lower end of the main elongated shaft portion 15 to protect the shaft assembly 13 at bend 36 when it is fabricated. By bending the lower end of the main elongated shaft portion 15 and the sleeve 38 together at one time, these pieces become interlocked to form an integral, unitary structure. Although the sleeve 38 is the preferred embodiment of this invention, it is not absolutely required as the lower shaft portion 14 and the main elongated shaft portion 15 can be bent from a singular straight metal shaft with the angular offset lower shaft portion 14 received in the bored hole 31.

To interconnect the shaft assembly 13 to the golf club head 12, an adhesive is applied to the surface of the lower shaft portion 14 or, as in the case of the preferred embodiment, to the surface of the sleeve 38. Then, the lower shaft portion 14 or the lower segment of the sleeve 38 is positioned so as to be received wholly or partially in the bored hole 31 and held in a fixed position until the adhesive has set up.

Figure 4:
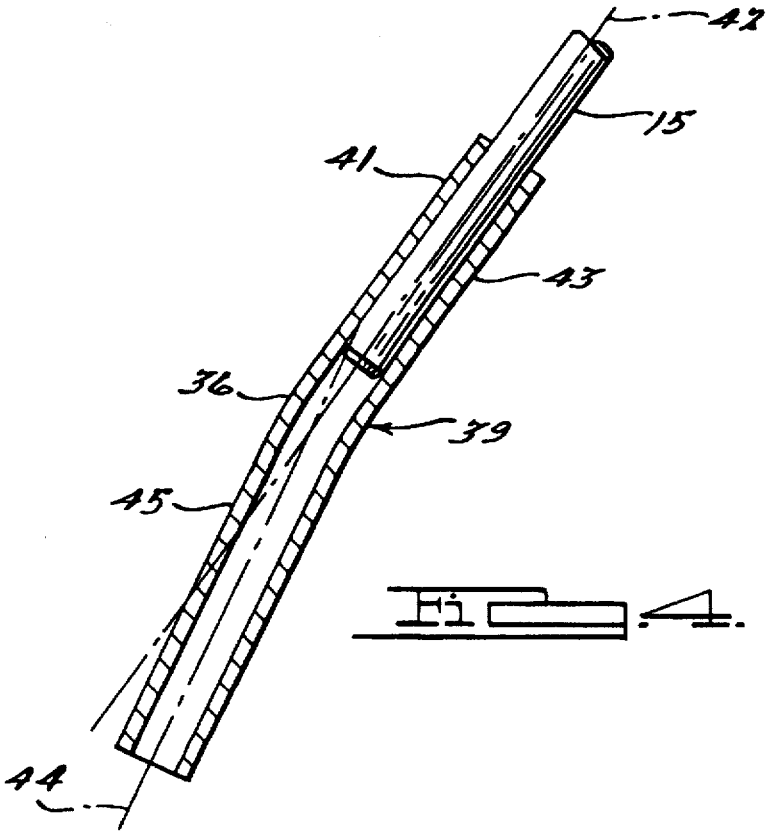
FIG. 4 is a cross-sectional view of a lower part of the shaft assembly incorporating an alternative embodiment of this invention.

In FIG. 4, a further embodiment of this invention is illustrated in which the lower part of the shaft assembly 13 incorporates an alternative construction. At times, the main elongated shaft portion 15 is fabricated from boron or graphite or some other material that cannot be bent. To accommodate this possibility, the construction of a shaft assembly 39 shown in FIG. 4 has been developed to duplicate the function of the lower shaft portion 14 as previously described and seen in FIG. 2. As seen in FIG. 4, a sleeve 41 or steel tubing is bent so that the center axis 42 of an upper portion 43 of the sleeve 41 is angularly displaced from the center axis 44 of a lower portion 45 of the sleeve 41 by about 7° to 15 degrees. The upper portion 43 of the sleeve 41 receives the bottom segment of the main elongated shaft portion 15 which is bonded into the upper portion 43. The lower portion 45 of the sleeve 41 is received in bored hole 31 of the club head 12 as seen in FIGS. 1, 2, and 3, and adhesively bonded thereto to achieve the interconnection of the shaft assembly 13 to the golf club head 12.

While only the preferred embodiments of the present invention have been described, others may be possible without departing from the scope of the appended claims.

I claim:

1. A golf club comprising a golf club head and a shaft assembly, said golf club head having a toe portion, a heel portion, a center of percussion substantially in the center of said club head, an upper surface contiguous with said toe portion and said heel portion, and a bored hole extending inwardly from said upper surface into said heel portion in an angular direction away from said center of percussion, said shaft assembly comprising a main elongated shaft portion and a lower shaft portion, the center axis of said lower shaft portion being angularly offset from the center axis of said main elongated shaft portion by an angle ranging from 7 to 15 degrees, and at least a part of said lower shaft portion being received in said bored hole, said main elongated shaft portion remaining exterior of said club head, the center axis of said main elongated shaft portion when extended downwardly into said club head passing in close proximity of said center of percussion.

2. A golf club comprising a golf club head and a shaft assembly, said golf club head having a toe portion, a heel portion, an upper surface contiguous with said toe portion and said heel portion, a center of percussion substantially at the center of said club head, and a bored hole extending inwardly from said upper surface into said heel portion in a direction away from said center of percussion, said shaft assembly comprising a main elongated shaft portion terminating in a bottom segment at one end thereof, and a sleeve, said sleeve having an upper portion and a lower portion, said lower portion being angularly offset from said main elongated shaft portion by an angle ranging from 7 to 15 degrees, said bottom segment of said main elongated shaft portion being received in said upper portion of said sleeve, said upper portion being external of said club head, the center axis of said main elongated shaft portion and said upper portion when extended downwardly into said club head passing in close proximity of said center of percussion, said lower portion of said sleeve being received in said bored hole to interconnect said shaft assembly to said golf club head.

3. A golf club comprising a golf club head and a shaft assembly, said golf club head having a toe portion, a heel portion, an upper surface contiguous with said toe portion and said heel portion, a convex-curved striking face, and a bored hole extending inwardly from said upper surface into said heel portion, said striking face having a forwardmost part at the center thereof, said shaft assembly comprising a main elongated shaft portion and a lower shaft portion, the center axis of said lower shaft portion angularly offset from the center axis of said main elongated shaft portion by an angle ranging from 7 to 15 degrees, at least a part of said lower shaft portion being received in said bored hole to interconnect said shaft assembly to said club head, said main elongated shaft portion remaining exterior of said club head, the center axis of said main elongated shaft portion when extended downwardly into said club head passing close to the center of said club head, the center axis of said lower shaft portion lying in a vertical plane to substantially parallel with a second vertical plane passing through a horizontal line tangent to said forwardmost part of said striking face.

4. A golf club as defined in claim 3 wherein said shaft assembly has a stub shaft integrally formed with said main elongated shaft portion, and a sleeve, said sleeve encompassing said stub shaft, said sleeve and said stub shaft being bent to angularly offset said lower shaft portion from said main elongated shaft portion.

5. A golf club as defined in claim 3 wherein a neck having an upper periphery extends upwardly at an angle from said upper surface at the heel portion of said golf club head, said bored hole extending through said neck into said heel portion of said golf club head, the center axis of said neck being substantially co-axial with the center line of said bored hole and said lower shaft portion received therein.

6. A golf club as defined in claim 5 wherein a ring encompasses the upper periphery of said neck.

7. A golf club as defined in claim 3 wherein said shaft assembly includes a sleeve, said sleeve encompassing said lower shaft portion and a segment of said main elongated shaft portion.

8. A golf club as defined in claim 7 wherein said sleeve and said lower shaft portion are bent together to provide an integral, unitary structure.

*9. A golf club comprising a golf club head and a shaft assembly, the golf club head having a toe portion, a heel portion, a center of percussion substantially in the center of the club head, an upper surface contiguous with the toe portion and the heel portion, and a hole extending inwardly from the upper surface into the heel portion in an angular direction away from the center of percussion, the shaft assembly further comprising a main elongated shaft portion and a lower shaft portion, the center axis of the lower shaft portion being angularly offset from the center axis of the main elongated shaft portion, and at least a part of the lower shaft portion being received in the hole, the main elongated shaft portion remaining exterior of the club head, the center axis of the main elongated shaft portion, when extended downwardly into the club head, passing in close proximity of the center of percussion.*

*10. A golf club comprising a golf club head and a shaft assembly, the golf club head having a center of percussion substantially in the center of the club head, and a hole extending inwardly into a heel portion of the club head in an angular direction away from the center of percussion, the shaft assembly further comprising a main shaft portion and a lower shaft portion, the center axis of the lower shaft portion being angularly offset from the center axis of the main elongated shaft portion, and at least a part of the lower shaft portion being received in the hole, the main shaft portion remaining exterior of the club head, the center axis of the main shaft portion, when extended downwardly into the club head, passing in close proximity of the center of percussion.*

*11. A method for interconnecting a golf club head and a golf club shaft, the golf club head having a center of percussion substantially in the center of the club head, the method comprising the following steps:*

1. *forming a hole extending inwardly into a heel portion of the club head in an angular direction away from the center of percussion;*
2. *forming a sleeve, the center axis of a lower portion of the sleeve being angularly offset from the center axis of an upper portion of the sleeve;*
3. *receiving into the hole at least a part of the lower portion of the sleeve;*
4. *receiving into the upper portion of the sleeve a lower portion of the shaft;*

*whereby the center axis of the shaft when extended downwardly into the club head passes in close proximity to the center of percussion.*

* * * * *